(12) United States Patent
Kroll

(10) Patent No.: US 7,659,484 B2
(45) Date of Patent: Feb. 9, 2010

(54) RETROFIT ELECTRONIC WEIGHING TECHNOLOGY FOR PALLET MOVING DEVICES

(75) Inventor: William Kroll, Medina, MN (US)

(73) Assignee: Intercomp Company, Minneapolis, MN (US)

( * ) Notice: Subject to any disclaimer, the term of this patent is extended or adjusted under 35 U.S.C. 154(b) by 161 days.

(21) Appl. No.: 11/002,524

(22) Filed: Dec. 1, 2004

(65) Prior Publication Data

US 2005/0220570 A1    Oct. 6, 2005

Related U.S. Application Data

(60) Provisional application No. 60/526,423, filed on Dec. 1, 2003.

(51) Int. Cl.
*G01G 19/02* (2006.01)
(52) U.S. Cl. .......................................... 177/130; 414/21
(58) Field of Classification Search ................... 414/21, 414/471, 603, 607; 177/130, 136, 139
See application file for complete search history.

(56) References Cited

U.S. PATENT DOCUMENTS

| | | | | |
|---|---|---|---|---|
| 4,666,004 A * | 5/1987 | Raz | ............................. | 177/139 |
| 5,064,008 A * | 11/1991 | Smith | ............................. | 177/1 |
| 5,739,478 A * | 4/1998 | Zefira | ........................... | 177/130 |
| 5,861,580 A * | 1/1999 | Moore et al. | ................. | 177/136 |
| 6,730,861 B1 * | 5/2004 | Simons | ........................ | 177/136 |
| 6,855,894 B1 * | 2/2005 | Van Seumeren | ............. | 177/130 |
| 2003/0010542 A1 * | 1/2003 | Simons | ........................ | 177/136 |
| 2003/0014214 A1 * | 1/2003 | Zefira | ........................... | 702/173 |

\* cited by examiner

*Primary Examiner*—Charles A Fox
(74) *Attorney, Agent, or Firm*—Skinner and Associates

(57) ABSTRACT

A weighing system for use in retrofitting a pallet handling apparatus to provide weighing functionality. The system comprises a control unit and two fork units. The electronic control unit has a display, an electronic weight calculation controller, and at least one control switch. Each fork unit is for substitution with one fork of the pallet handling apparatus. Each fork unit comprises a rigid frame member having an elongated configuration, a plurality of load cells fixedly connected to the frame member, the load cells being disposed in laterally oriented pairs, and a fork member communicatively connected to the frame and engaging the load cells.

13 Claims, 17 Drawing Sheets

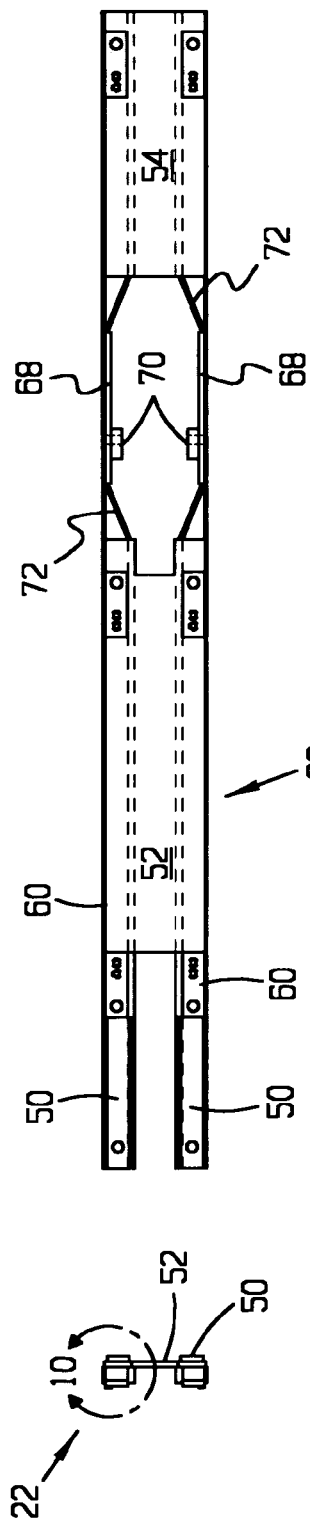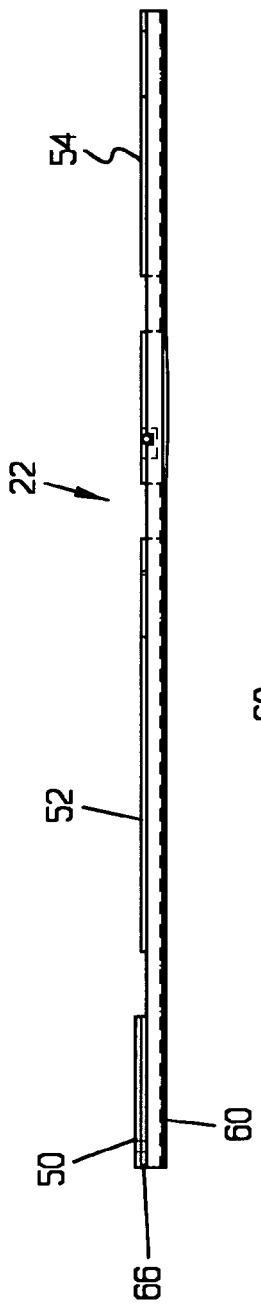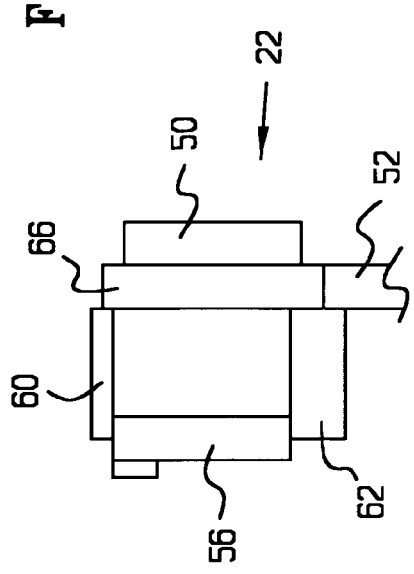

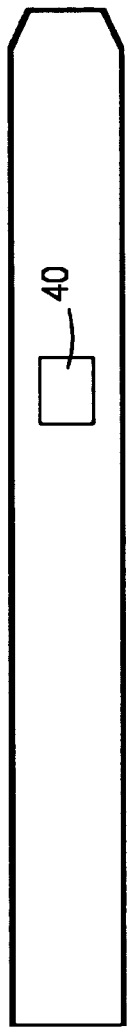
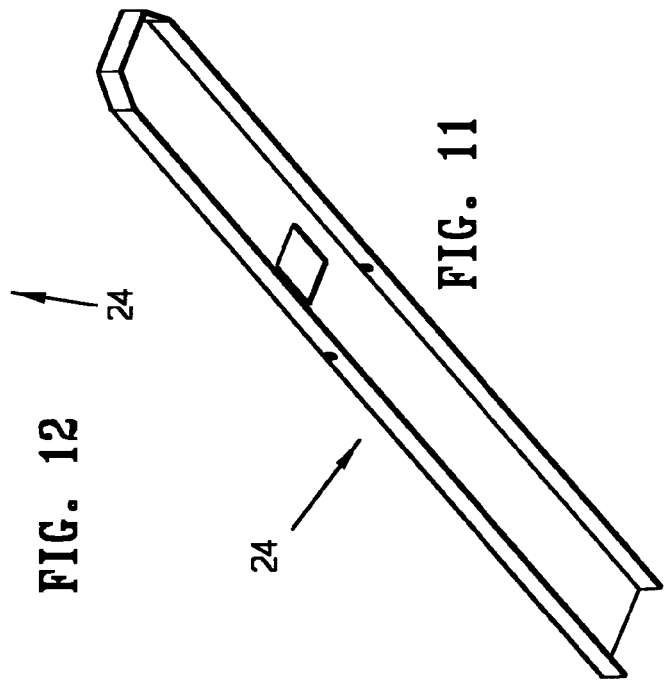
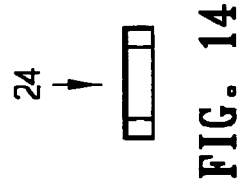

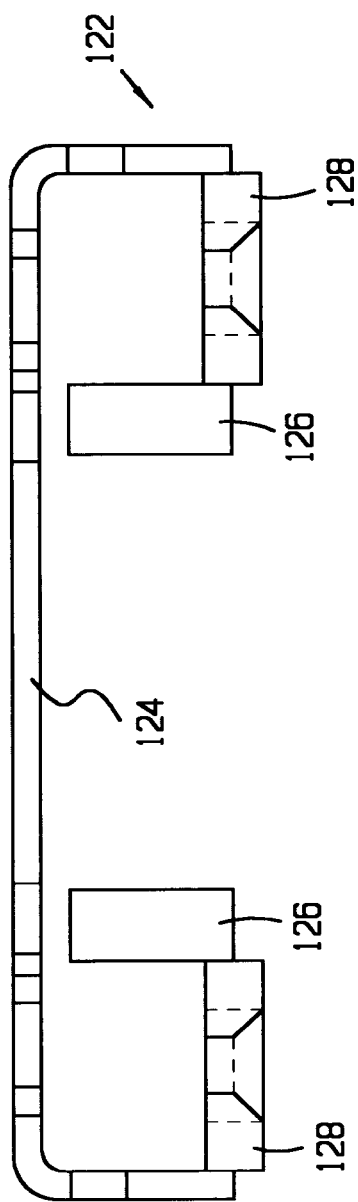
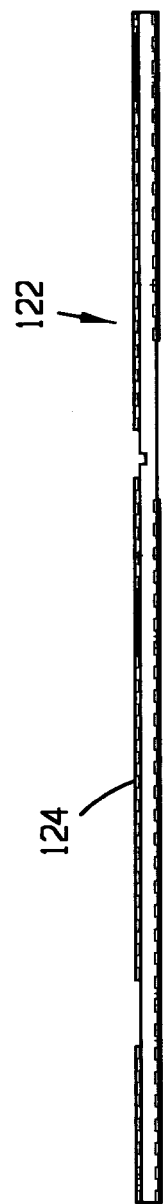
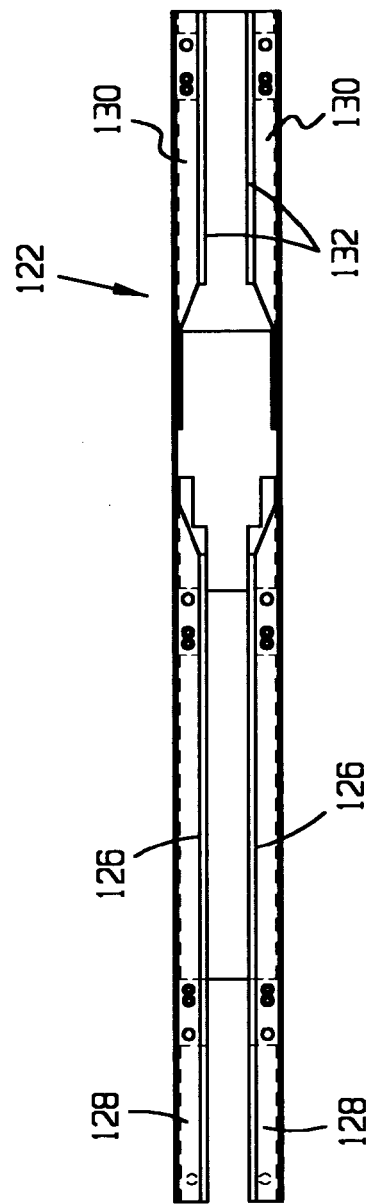
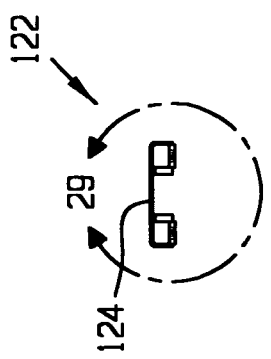
FIG. 29
FIG. 27
FIG. 26
FIG. 28

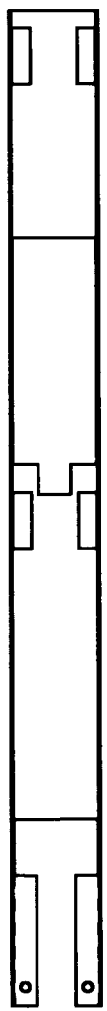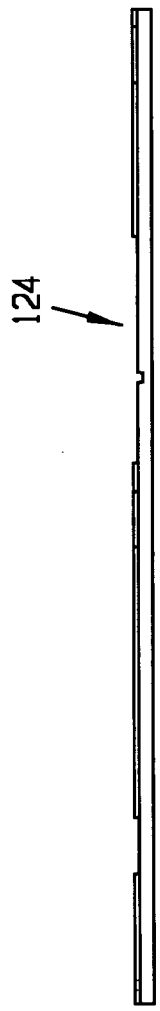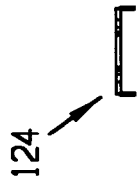

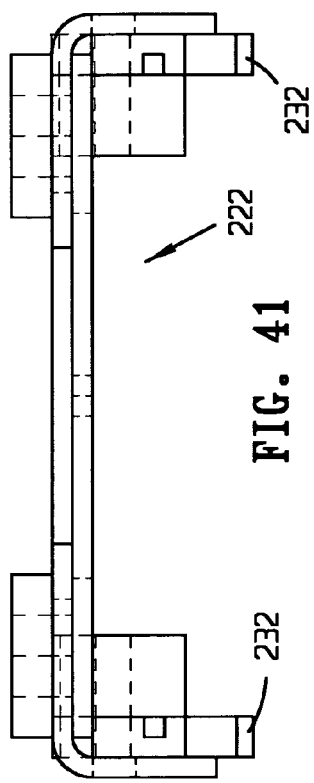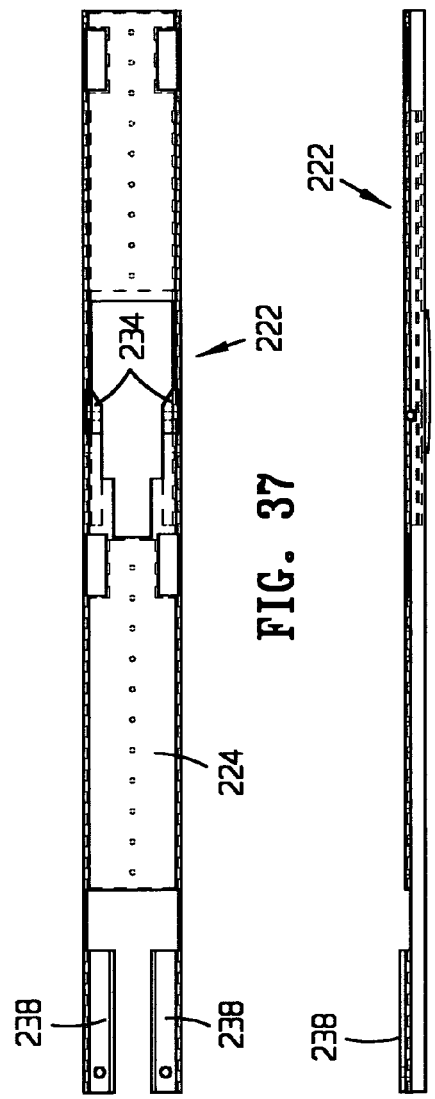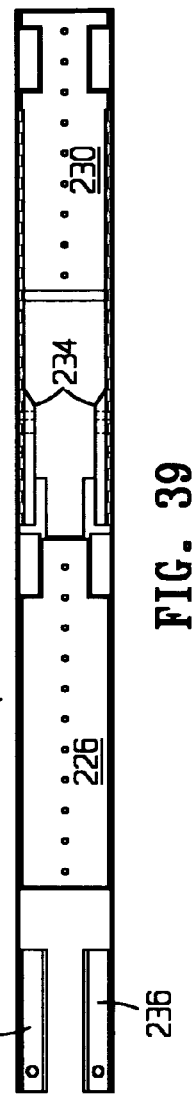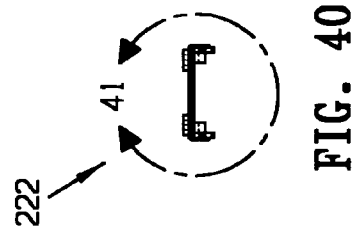

RETROFIT ELECTRONIC WEIGHING TECHNOLOGY FOR PALLET MOVING DEVICES

CROSS-REFERENCE TO RELATED APPLICATIONS, IF ANY

This application claims the benefit under 35 U.S.C. §119 (e) of co-pending U.S. Provisional Patent Application Ser. No. 60/526,423, filed Dec. 1, 2003, which is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to weighing apparatus and methods. Particularly, the invention relates to pallet truck and pallet walkie scale apparatus and methods. Most particularly, the invention relates to an electronic scale retrofit system for an existing pallet walkie or lift truck. The invention may apply to other apparatus and methods.

2. Background Information

The state of the art includes the PW800™ pallet truck scale, which integrates a weigh scale into a lift truck and is provided by Intercomp Company of Minneapolis, Minn. USA. Intercomp Company has also disclosed electronic weigh scales systems and components in the following U.S. Pat. Nos. 5,228,527; 5,232,064; 5,646,376; and 5,894,112.

Lift trucks or "walkies" are hand movable forks which are used to move pallets of material in various commercial and industrial settings. A large number of walkies exist without a scale. A need is believed to exists for the present invention to add a weigh scale to such existing walkies.

All U.S. patents and patent applications, and all other published documents mentioned anywhere in this application are incorporated by reference in their entirety.

BRIEF SUMMARY OF THE INVENTION

The invention provides a walkie retrofit apparatus and method which is practical, reliable, accurate and efficient, and which is believed to fulfil the need and to constitute an improvement over the background technology.

The system transforms an existing pallet truck, walkie or lift truck, including class II, III, IV and bar mount carriages, into a mobile weighing station. It can be used on standard 48 inch single pallet and 96 inch double pallet apparatus, with capacities up to 10,000 lbs. Power is supplied from the walkie's existing power pack without appreciably reducing overall run time. It can be configured for bar code scanning, data printout and RF wireless capabilities.

The invention enables fast and accurate weighing during movement of a pallet. This maximizes efficiency and minimizes guesswork in shipping, receiving, manufacturing, and other materials handling environments. Specifically, it an added process step and reliance on centralized stationary scales. Time is saved and accountability is improved.

In a general aspect the invention provides a weighing apparatus for a pallet handling apparatus, comprising a frame member, at least one load cell connected to the frame member, and a fork member communicatively connected to the frame and engaging the at least one load cell.

In a more specific aspect, the invention provides a weighing system for use in retrofitting a pallet handling apparatus to provide weighing functionality. The system comprises a control unit and two fork units. The electronic control unit has a display, an electronic weight calculation controller, and at least one control switch. Each fork unit is for substitution with one fork of the pallet handling apparatus. Each fork unit comprises a rigid frame member having an elongated configuration, a plurality of load cells fixedly connected to the frame member, the load cells being disposed in laterally oriented pairs, and a fork member communicatively connected to the frame and engaging the load cells.

The features, benefits and objects of the invention will become clear to those skilled in the art by reference to the following description, claims, and drawings.

BRIEF DESCRIPTION OF THE DRAWINGS

FIG. 7 is a top view of the frame member.

FIG. 8 is a side view of the frame member.

FIG. 9 is an end view of the frame member.

FIG. 10 is a detailed view of a portion of the end view of FIG. 9.

FIG. 11 is a perspective view of the false fork member.

FIG. 12 is a top view of the false fork member.

FIG. 13 is a side view of the false fork member.

FIG. 14 is an end view of the false fork member.

FIG. 26 is a bottom view of the frame of FIG. 25.

FIG. 27 is a side view of the frame of FIG. 25.

FIG. 28 is an end view of the frame of FIG. 25.

FIG. 29 is a detailed view of FIG. 28.

FIG. 31 is another perspective view of the top plate member of FIG. 30.

FIG. 32 is a side view of the top plate member of FIG. 30.

FIG. 33 is a top view of the top plate member of FIG. 30.

FIG. 34 is an end view of the top plate member of FIG. 30.

FIG. 37 is a top view of the frame member.
FIG. 38 is a side view of the frame member.
FIG. 39 is a bottom view of the frame member.
FIG. 40 is an end view of the frame member.
FIG. 41 is a detailed view of the frame member shown in FIG. 40.

DETAILED DESCRIPTION

The present invention provides embodiments of an electronic weigh scale retrofit system and method for a pallet truck, walkie or lift truck. It enables a quick and effective retrofit of an existing pallet device, for example a 48 inch single pallet walkie or a 96 inch double pallet walkie. Power is supplied from the walkie's existing power pack. The system can be configured for 12, 24 or 48 VDC. The system can be configured for various capacities, fork lengths and widths, and heights, lifting heights, and pallet apparatus accessories. Exemplary weighing capacities include, but are not limited to 10,000 pounds.

Figure 1:
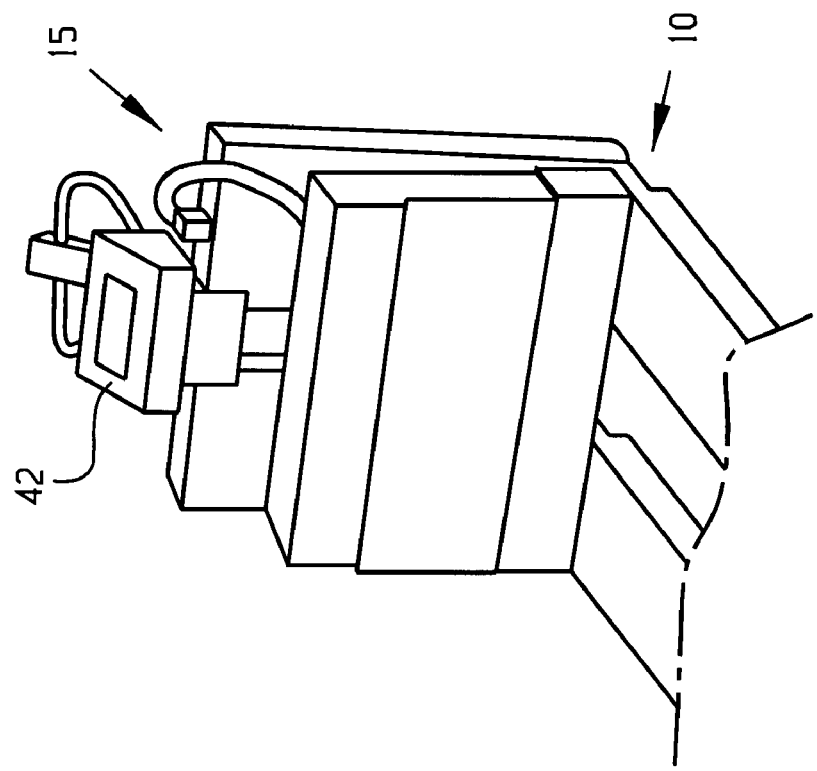
FIG. 1 illustrates an embodiment of the electronic weigh scale system of the invention.
Figure 2:
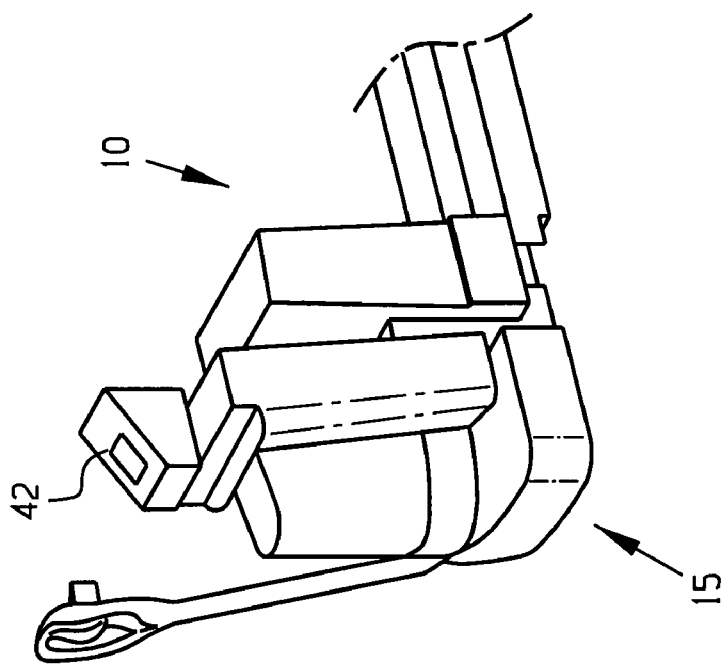
FIG. 2 further illustrates the system.

FIGS. 1 and 2 show an embodiment of the retrofit weigh scale system 10 of the present invention operatively connected to an electric walkie 15.

Figure 3:
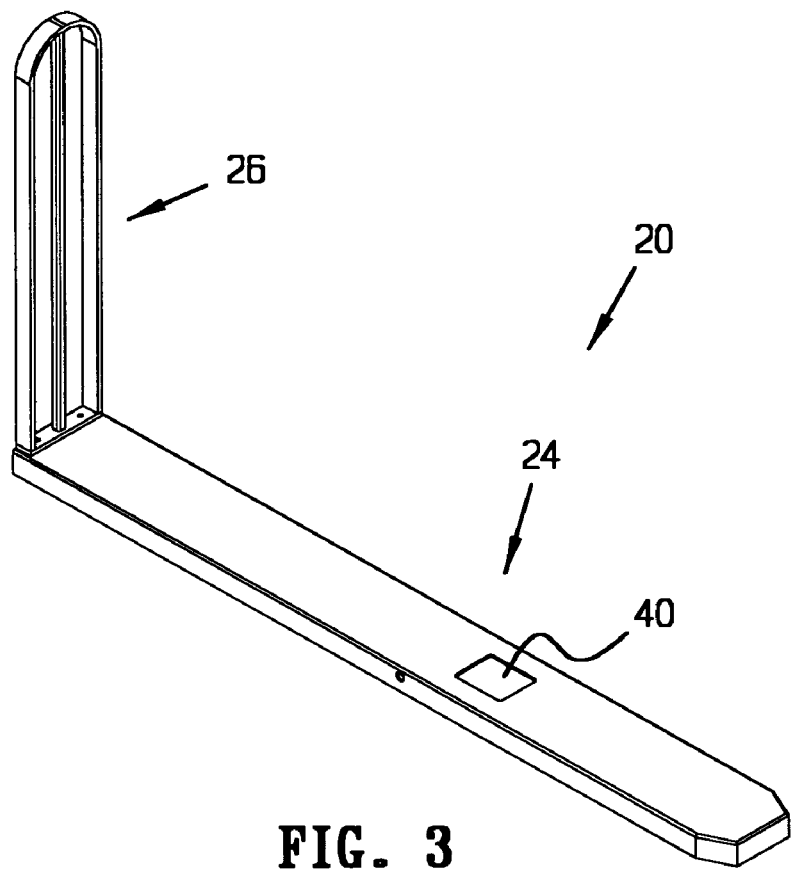
FIG. 3 is a perspective view of an embodiment of a false fork member of an embodiment of a retrofit scale assembly of the invention.
Figure 4:
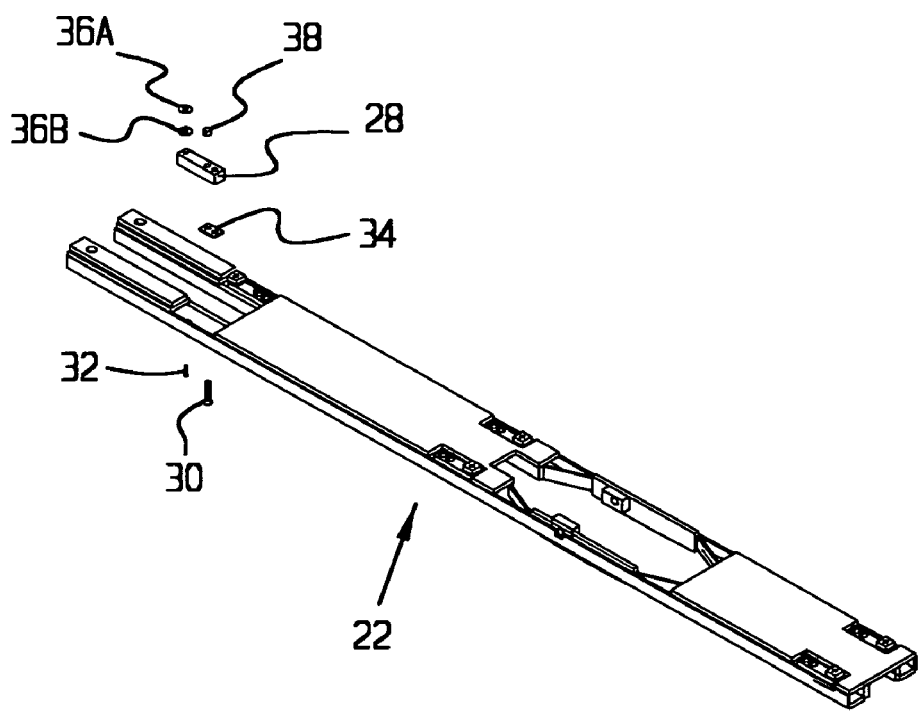
FIG. 4 is a perspective view of an embodiment of a frame member of the retrofit scale assembly.
Figure 5:
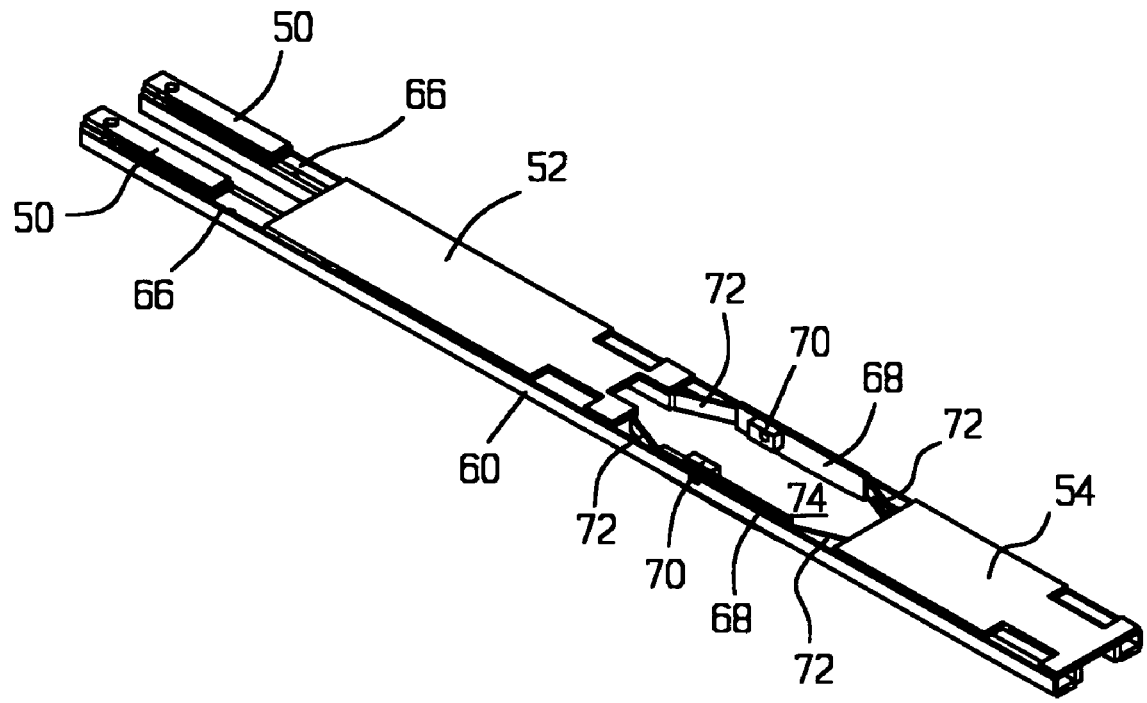
FIG. 5 is a further perspective view of the frame member.
Figure 6:
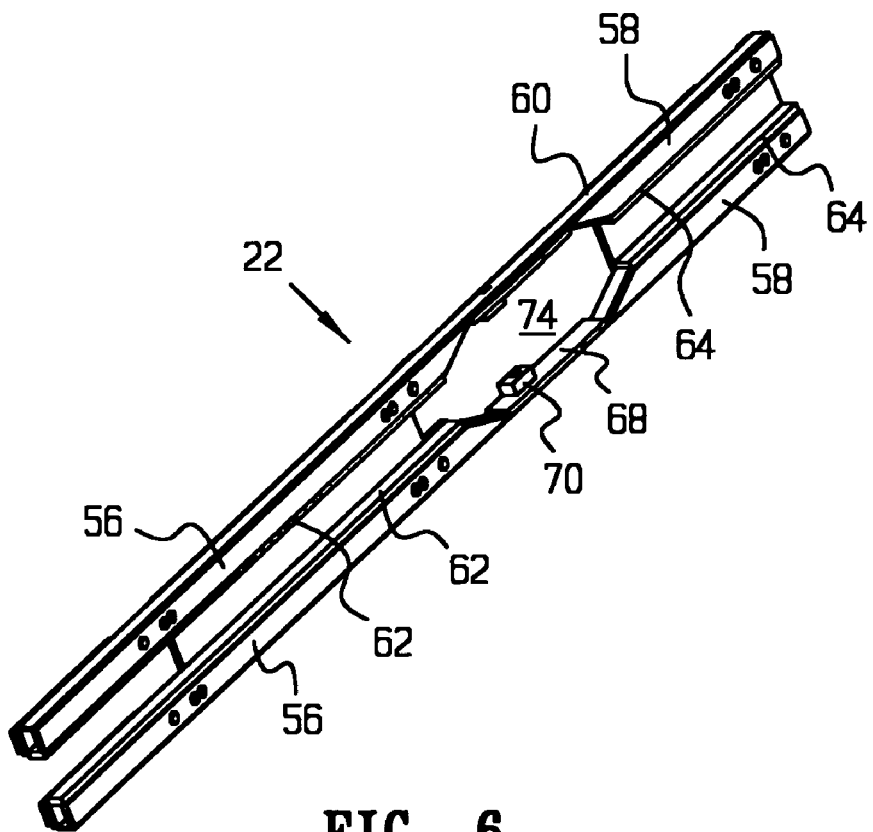
FIG. 6 is another perspective view of the frame member.

Referring to FIGS. 3 and 4, an embodiment 20 of the retrofit scale system comprises a pair of fork/scale unit 20 (one associated with each fork of the pallet apparatus), each of which comprises a horizontally disposed frame or frame member 22, a fork member or false fork 24 disposed parallel to the frame 22, and a vertically disposed fork back 26 connected to the proximal or back end of the false fork 24. At least one electronic load cell 28, in this case six (6) are connected to the frame 22. The connection is preferably made by flat socket head cap screws 30a,b, socket head cap screw 32, load cell spacer 34, spherical washers 36a,b, and nuts 38. This assembly is constructed and arranged to permit the fork to move vertically a small amount, for example about 0.125 inches in this embodiment. Aperture 40 permits extension of the pallet device fork wheel (not shown). The load cells 28 are electronically communicatively connected to a control system 42. The load cells 28 convert mechanical force received from the contents of the pallet (not shown) disposed on the false fork 24 to electrical signals, which are transmitted to the control system 42 to yield an equivalent weight value. The load cell 28 configuration receives sensitive vertically oriented forces which are the result of the pallet load, but is relatively insolated from horizontal forces caused by bumping, jarring, starting, stopping and other movement associated with pallet transportation.

Referring to FIGS. 5-10, the length and width of the frame 22 is dependent upon the dimensions of the pallet device fork which it is substituted for. This embodiment of the frame 22 comprises a pair of rear or proximal top plates 50, a long, central top plate 52, and a short, distal top plate 54. The rigid, preferably metal plates are connected to proximal, long bottom straps 56 and distal, short bottom straps 58 as shown. Outside strap 60 is connected to the bottom straps 56 and 58. Long, proximal inside straps 62 and short, distal inside straps 64 are also connected to the bottom straps 56 and 58. Sub-plates 66 are preferably disposed under proximal top plates 50. Pivot supports 68 are connected to the outside strap 60. Pivot blocks 70 are connected to the pivot supports 68. Angle supports 72 are disposed about aperture 74. This assembly yields a strong, rigid frame 22 structure.

FIGS. 11-14 show the rigid, elongated structure of a false fork 24. The length, width, and height of the false fork 24 is variable depending upon the dimensions of the frame 22.

Figure 17:
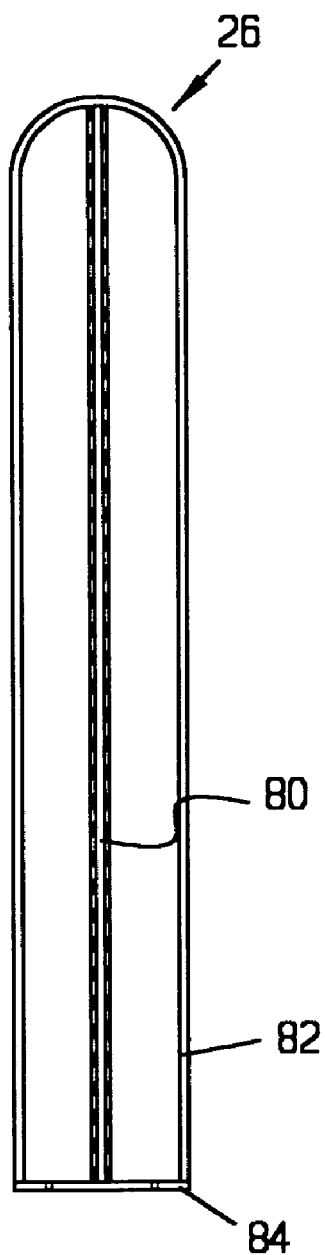
FIG. 17 is a front view of the fork back member.
Figure 16:
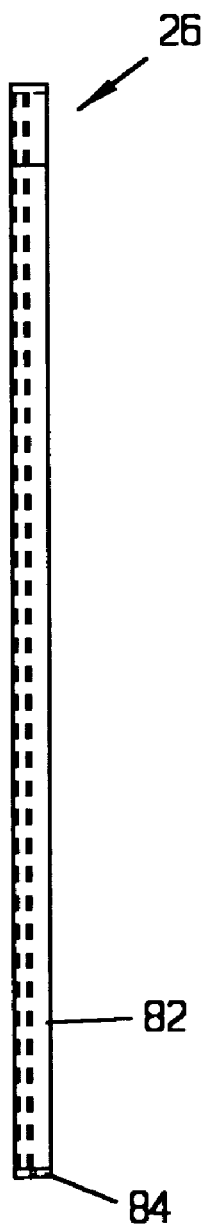
FIG. 16 is a side view of the fork back member.
Figure 15:
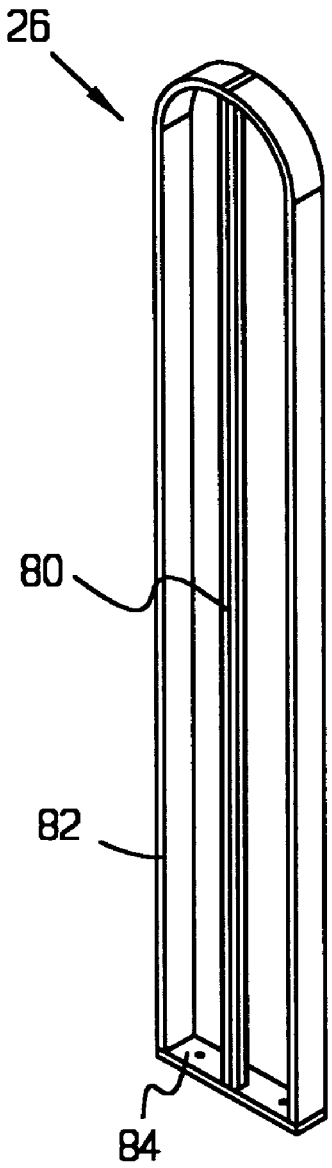
FIG. 15 is a perspective view of an embodiment of a fork back member of the retrofit scale assembly.
Figure 18:
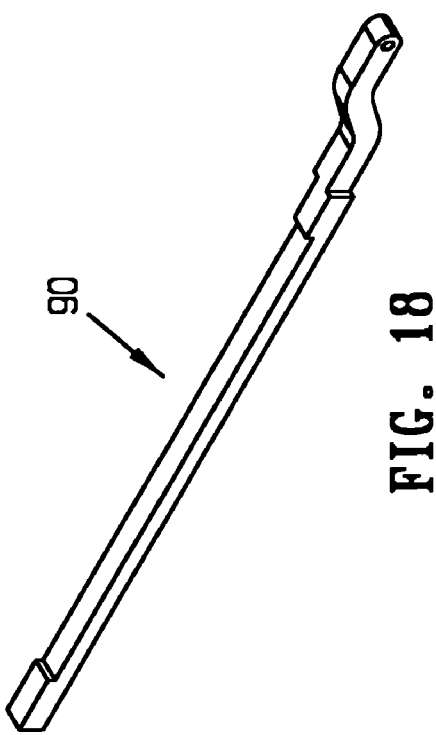
FIG. 18 is a perspective view of a push rod of the retrofit scale assembly.

FIGS. 15-17 show the structure of the fork back 26. Preferably, the back 26 comprises a frame center member 80, a frame side member 82 and a frame bottom member 84.

Figure 20:
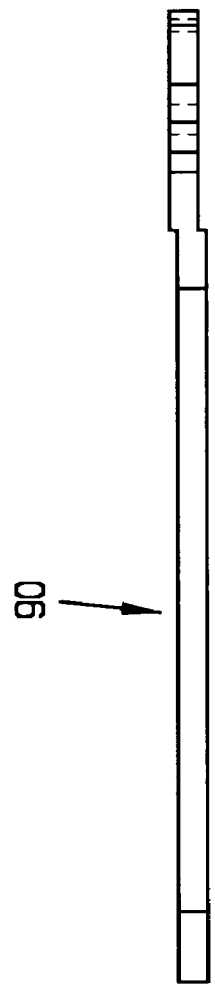
FIG. 20 is a side view of the push rod.
Figure 19:
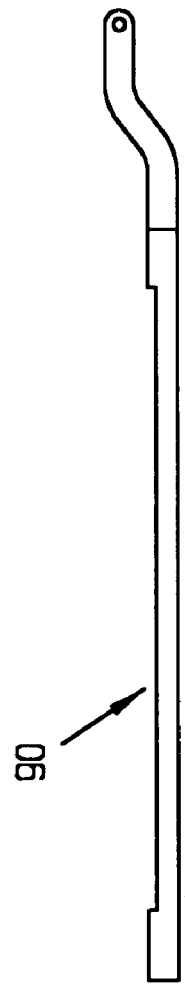
FIG. 19 is a top view of the push rod.
Figure 21:
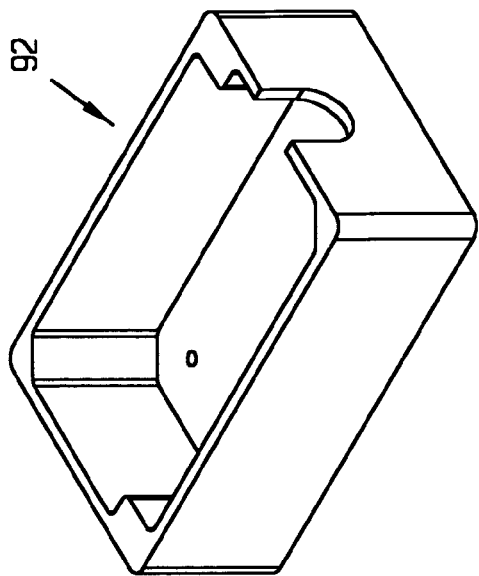
FIG. 21 is perspective view of a summing box of the retrofit scale assembly.
Figure 22:
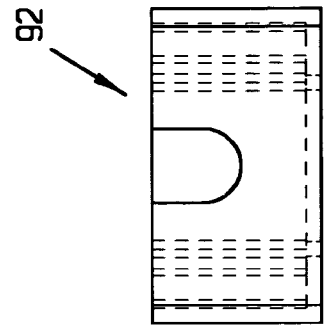
FIG. 22 is an end view of the summing box.
Figure 24:
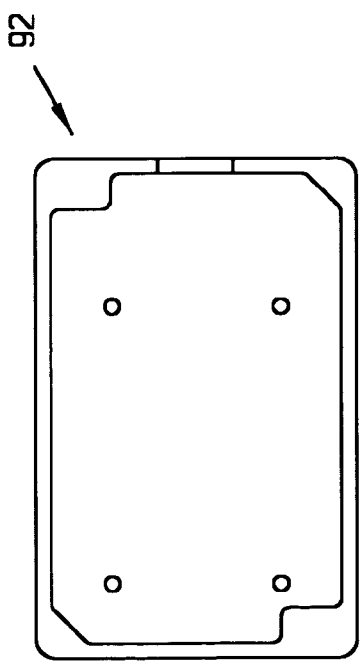
FIG. 24 is a top or front view of the summing box.
Figure 23:
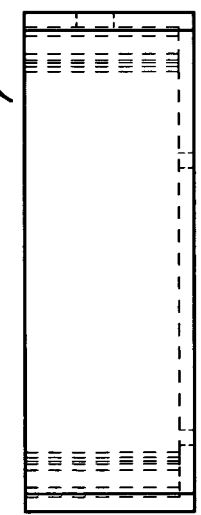
FIG. 23 is a side view of the summing box.
Figure 25:
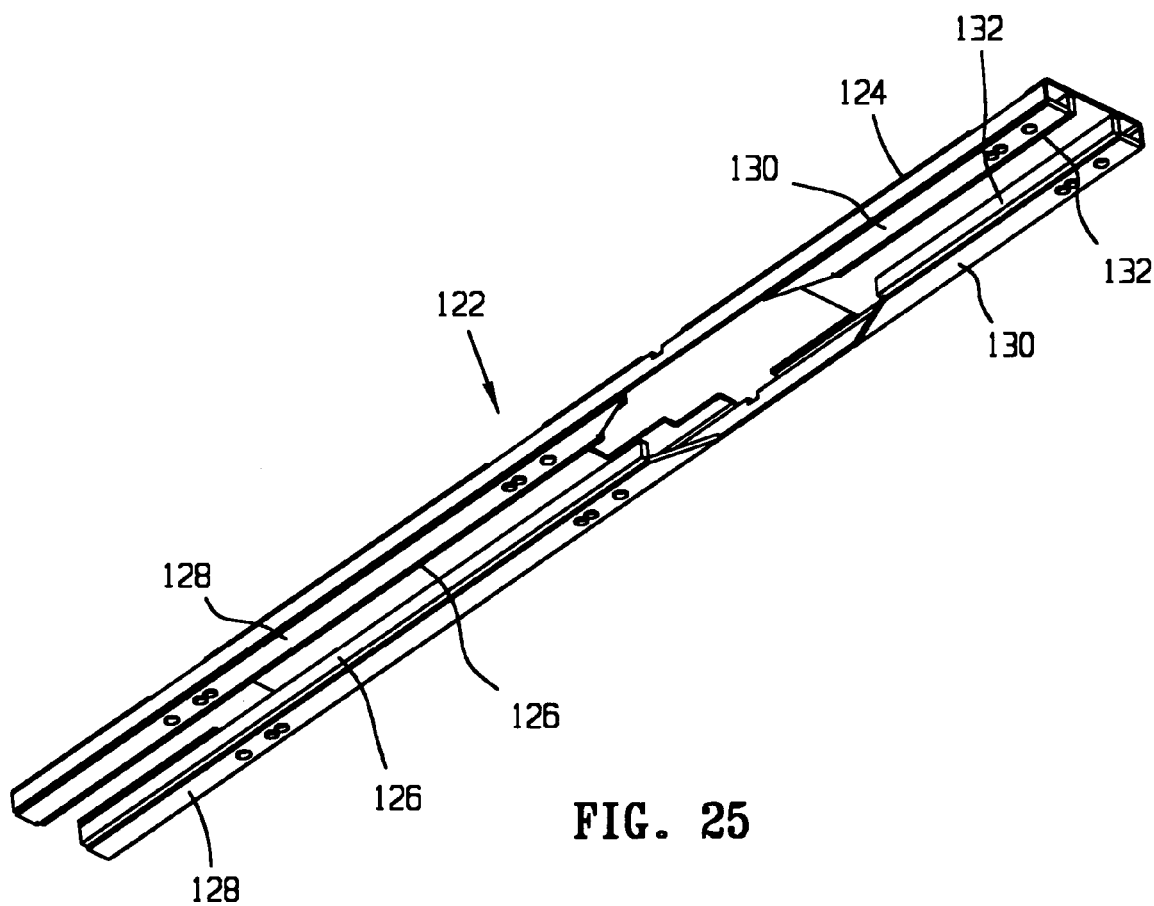
FIG. 25 is a perspective view of an alternative embodiment of the retrofit scale assembly frame.
Figure 30:
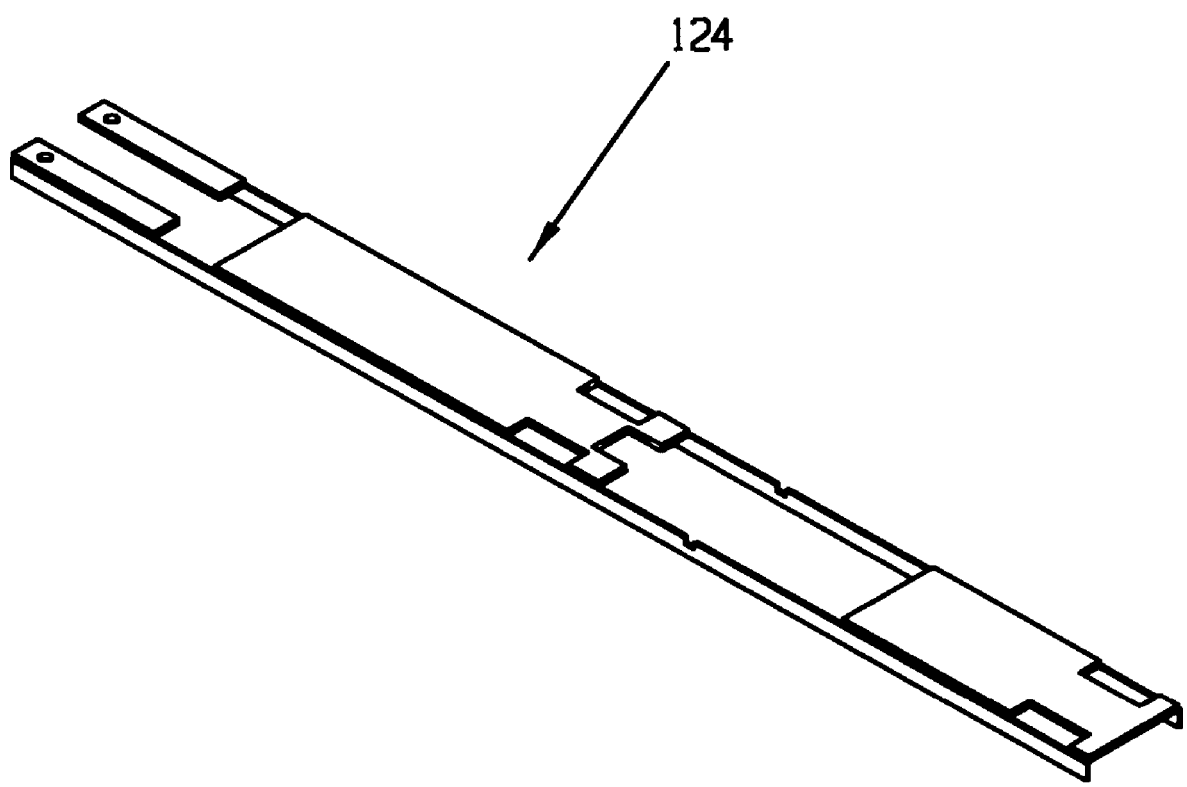
FIG. 30 is a perspective view of the top plate member of the frame of FIG. 25.
Figure 35:
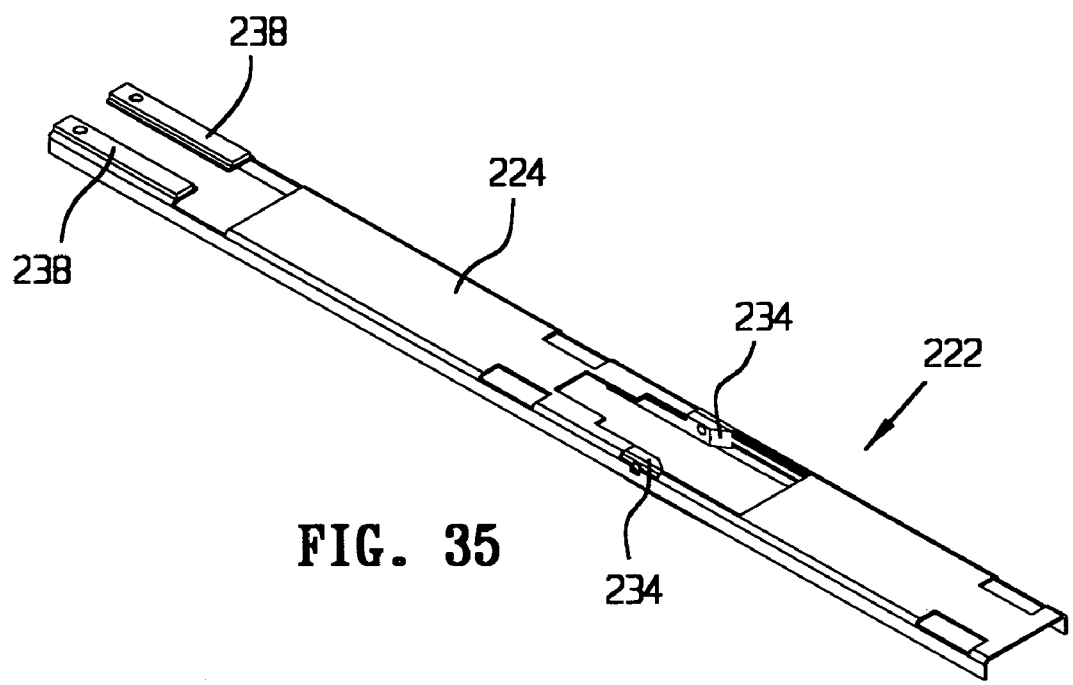
FIG. 35 is a perspective view of another embodiment of the frame member.
Figure 36:
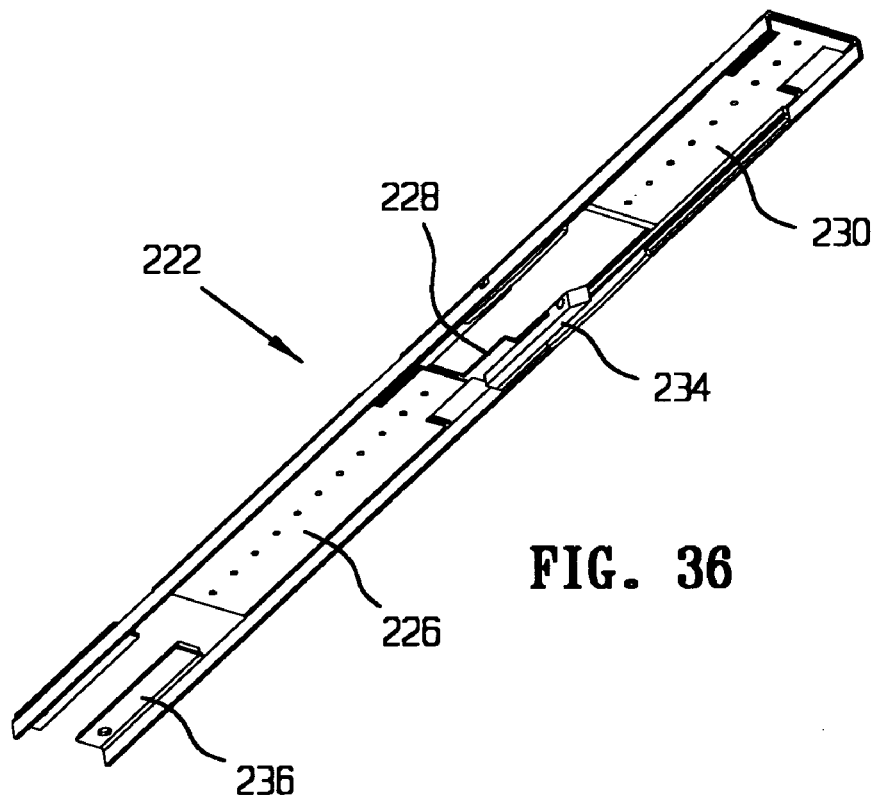
FIG. 36 is another perspective view of the frame member shown in FIG. 35.
Figure 42:
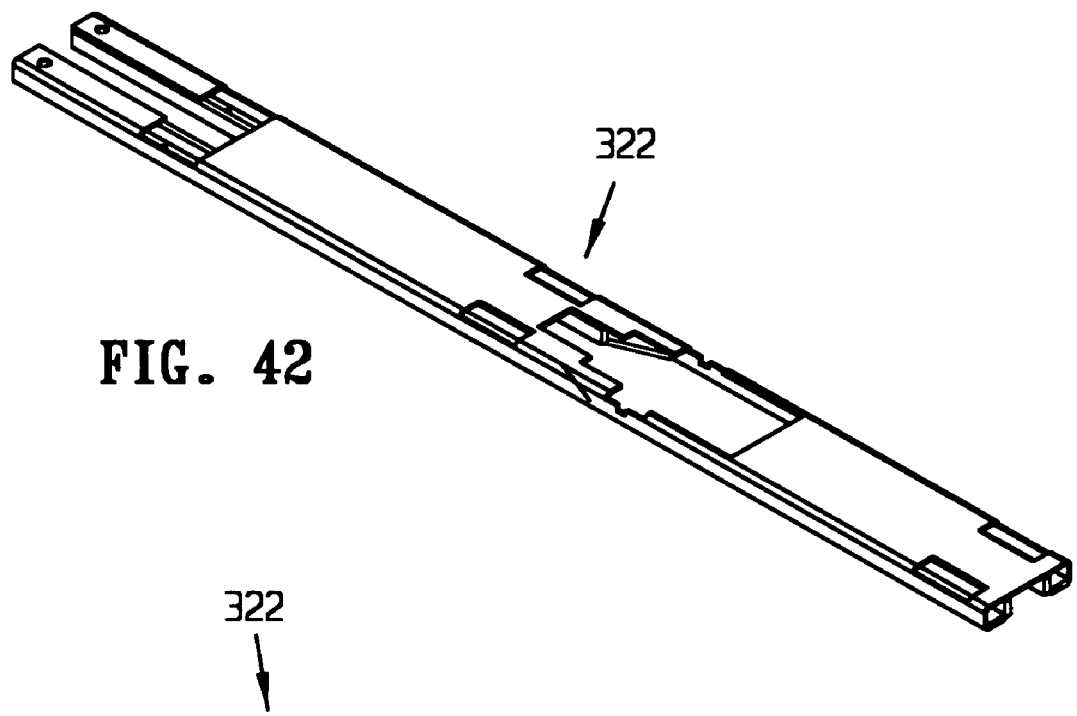
FIG. 42 is a perspective view of yet another embodiment of the frame member.
Figure 48:
FIG. 48 is a detailed view of the frame member shown in FIG. 47.
Figure 43:
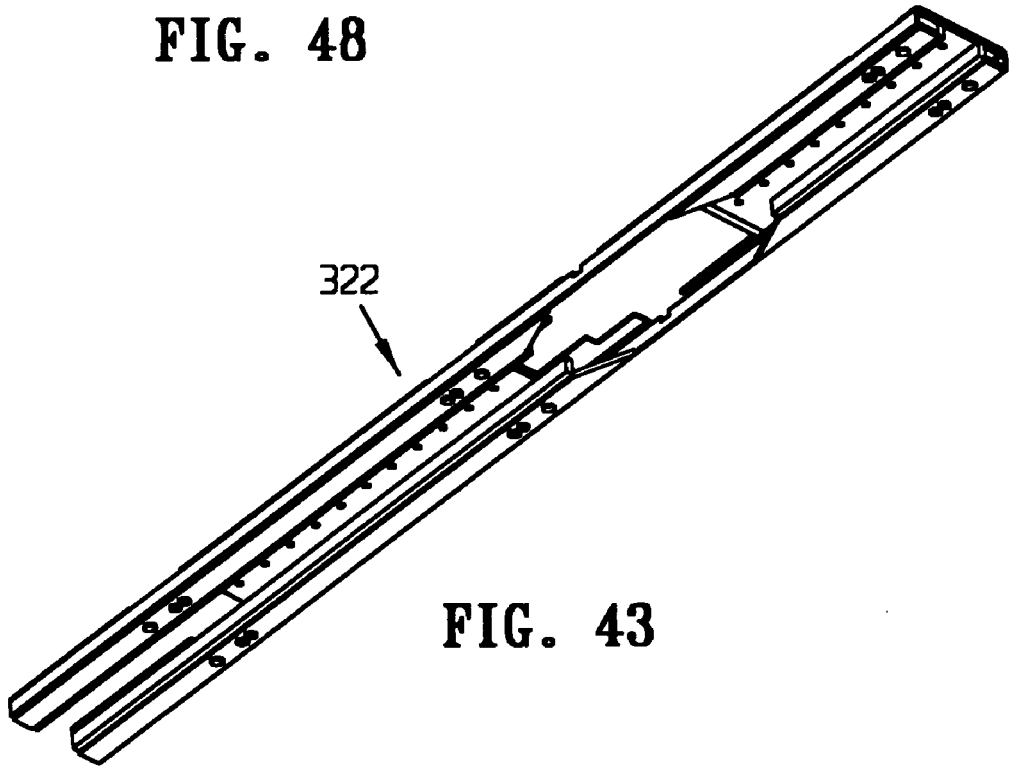
FIG. 43 is another perspective view of the frame member shown in FIG. 42.
Figure 44:
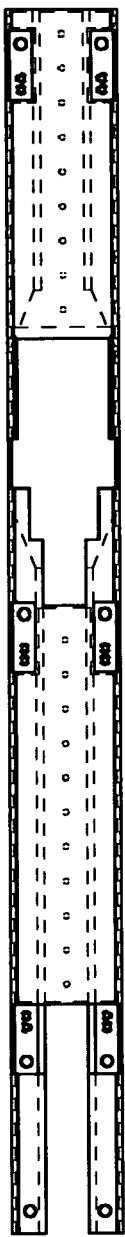
FIG. 44 is a top view of the frame member of FIG. 42.
Figure 45:
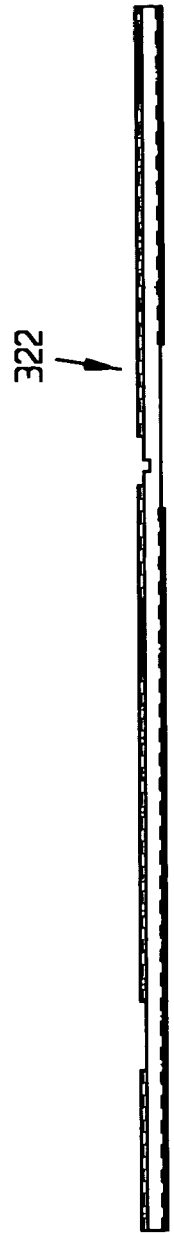
FIG. 45 is an end view of the frame member.
Figure 46:
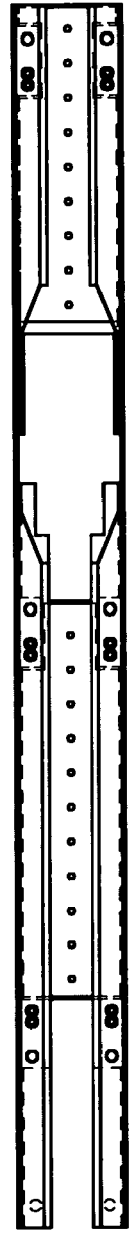
FIG. 46 is a bottom view of the frame member.
Figure 47:
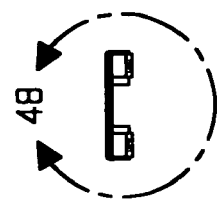
FIG. 47 is an end view of the frame member.

FIGS. 19-20 show an embodiment of a push rod 90.

FIGS. 21-24 show an embodiment of a summing box 92. The summing box 92 securely holds and protects electronic summing hardware (not shown) which is communicatively connected to each load cell 28 and to the pallet apparatus power supply.

FIGS. 25-29 show an alternative embodiment of the retrofit scale assembly frame 122, for use with dual wheel pallet devices, comprising a top plate 124, proximal bottom straps 126, proximal inside straps 128, distal bottom straps 130 and distal inside straps 132. The configuration of the top plate 124 is further shown in FIGS. 30-34.

FIGS. 35-41 show another embodiment of the frame member 222 comprising a top plate 224, proximal, middle and distal top plate under supports 226, 228 and 230, pivot side straps 232, pivot axle supports 234, distal under supports 236 and distal top plates 238.

FIGS. 42-48 show another embodiment of the frame member 322.

Figure 49:
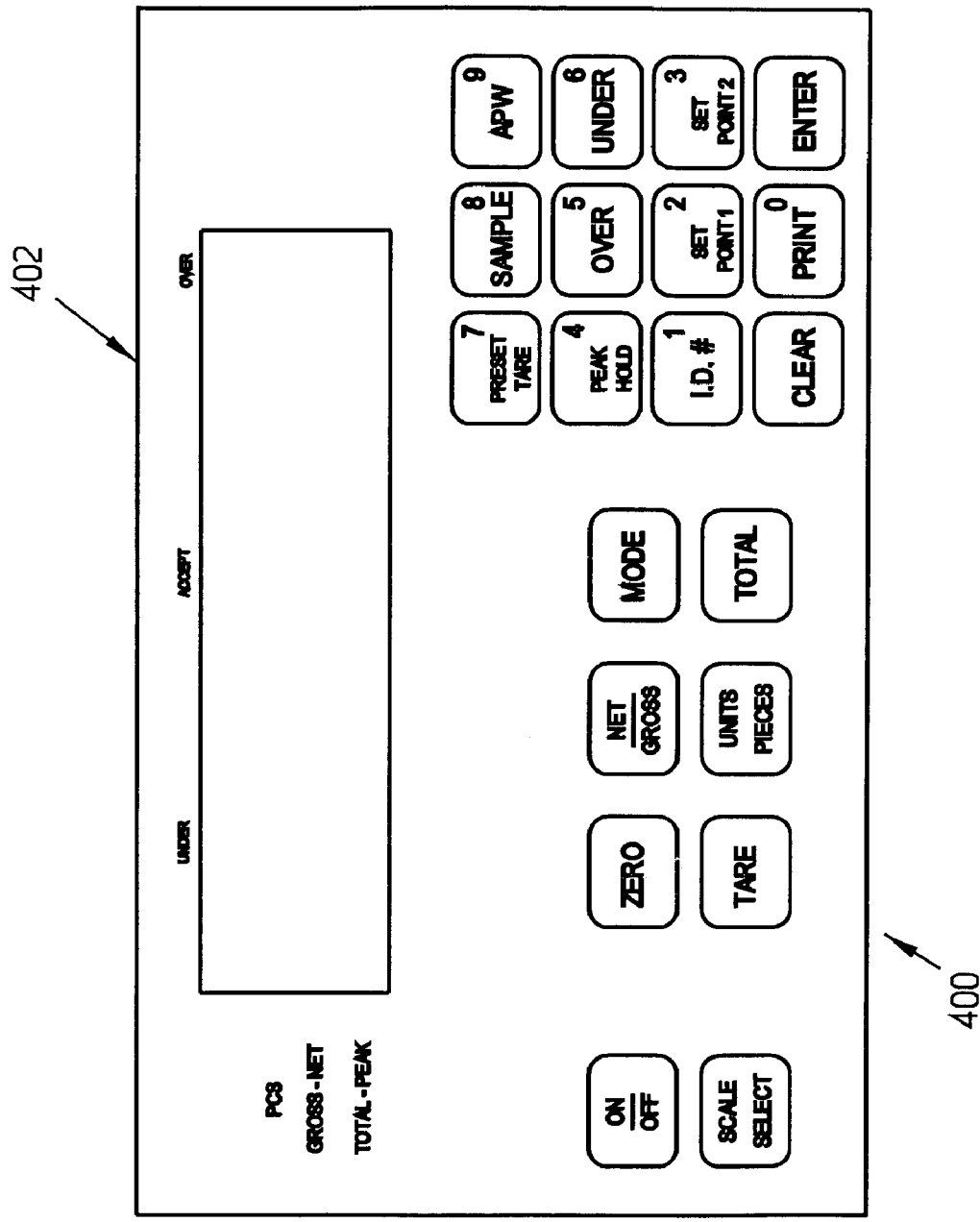
FIG. 49 illustrates an embodiment of a control panel of the system of the invention.

FIG. 49 shows an embodiment of a control panel 400 of the system including a display 402 and a plurality of self explanatory control buttons, the general function of which is described below:

ON/OFF

Press and hold this button 1 second to turn the scale on and off. The scale tests itself; when this test is completed successfully the system begins weighing. The product I.D. and software version number are display for a couple seconds upon power up. The number on the left is the product ID and the number on the right is the software version number.

NUMERIC KEYPAD

Many operations require the operator to enter a number. The 10-key numeric keypad is used to enter numbers. These keys also have specific functions (as labeled) when the scale is in normal weighing mode.

ENTER

Press the ENTER key after entering a number.

CLEAR

If operator want to clear the number displayed (while in the process of entering a number), press the Clear key.

ZERO

Tells the scale to display zero weight. This button is used any time the scale shows a non-zero value with no weight on the load cell. If operator press ZERO with weight on the load cell, that weight becomes the zero condition for the scale. This can be useful to cancel the weight of any weighing fixtures, such as barrels or boxes. When this weight is removed, a negative number is displayed until the system is re-zeroed. The 'zero' command will be delayed any time a change in weight is detected. While the scale is stabilizing, the display will show "-0-". If there is continuous motion for about 15 seconds, the zero command will be rejected and the scale will return to normal weighing.

AZT (Auto Zero Tracking)

This system contains a feature called Auto Zero Tracking (AZT), which corrects slight zero changes during normal operation. If small weights are added while the display is at or near zero, the scale may zero them off.

PRINT

Press PRINT after operator have the displayed weight on the SYSTEM and wish to send the information to operator system/device.

NET/GROSS

Toggles the readout between net weight and gross weight. Net weight applies only when there is a tare set. The indicator on the left side shows if the SYSTEM is displaying gross or net weight.

Net=Gross−Tare

TARE

Use this button to read a tare weight into memory. This tare weight will be subtracted from the gross weight, giving operator the net weight. This is useful for canceling the weight of a container used in weighing. A segment in the lower left corner of the display shows that the net weight is being calculated. Operator may press the TARE SET/DISPLAY button to show the tare weight anytime the scale is in net mode; the tare weight will show while operator press the button. To clear the tare press the TARE and CLEAR keys simultaneously. Tare does not function in pieces unit.

PRESET TARE

Pressing the PRESET TARE key will bring up a screen that allows the user to enter a tare value. Enter the tare value using the numeric keypad and then press ENTER. To clear the tare press the TARE and CLEAR keys simultaneously.

UNITS/PIECES

Toggles the weighing system between pound (English), and kilogram (SI metric), and 'pieces' (quantity of items) units of measure. When operator press this switch, the systems witches to the nearest comparable value in the selected system. The current unit of measure is shown by indicator segments on the left side of the main display.

SAMPLE

Sample is used to so operator can view the weight in pieces. Place a number of items on the scale. A good rule of thumb is to place 3%-5% of the total number of pieces operator intend to weigh. With a known quantity of items on the scale press the SAMPLE key. Enter the number of items on the scale. The sample measurement is saved in the scale's memory. The scale will switch to the unit 'pieces' and display the number of pieces on the scale. To clear the sample measurement saved in memory, press the SAMPLE and CLEAR keys simultaneously.

APW

APW is the abbreviation of Average Piece Weight. Press the APW key. Enter the average weight of one piece. The scale switches to 'pieces' unit and displays the number of pieces on the scale. To clear the APW press the APW and CLEAR keys simultaneously. If operator need to enter piece weights less than 1 lb. or 1 kg, see the APW decimal position section in 'Calibration'. This can setup the SYSTEM to record APW's by tenths (1 decimal place) or by hundredths (2 decimal places).

TOTAL

This function is used to record an accumulated total. When operator press the TOTAL key, the weight that is to be added to the accumulated total will blink for about 5 seconds. To add this to the total, press the TOTAL key again before the value stops blinking. The accumulated total will be displayed for about 2 seconds and return to the previous weighing mode.

If operator just want to view the total, press and hold the TOTAL key for about 3 seconds. The weight will be displayed until operator release the key. To clear the accumulated total, press the TOTAL and CLEAR keys simultaneously.

PEAK HOLD

The peak hold feature will remember the maximum weight applied. While in peak mode it will not display any weight less than the maximum weight. To turn on the peak mode press PEAK, to turn off the peak mode press PEAK again. The peak indicator will be blinking if in peak mode. To clear the current peak weight press the ZERO key.

SET POINT 1

This is an optional feature that allows for an external set point. When the specified weight (set point) is reached, a logic level high will be on the set point connection. Setpoints are used with some other device (e.g. alarm, relay) in conjunction to the SYSTEM. To activate a set point press the Set Point 1 (or Set Point 2) key. Enter the weight operator wants the set point to activate.

SET POINT 2

Operates the same as Set Point 1.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A weighing apparatus for a pallet handling apparatus, comprising a frame member including proximal, central and distal top plates, an aperture for a wheel of the pallet truck located between the central and distal top plates, a pair of outside strap members, a pair of proximal inside strap members and a pair of distal inside strap members, and a pair of proximal bottom strap members and a pair of distal bottom strap members, the apparatus further comprising at least one load cell fixedly coupled to a top surface of the frame member, and a load bearing fork member disposed over the frame member and movably engaging a top surface of the at least one load cell whereby the load cell is adapted to vertically move in response to a load on the fork member, the fork member being unattached to the load cell whereby the fork member is free to move over the load cell to insulate the load cell from horizontal forces caused by bumping, jarring, starting, stopping and other movement associated with pallet transportation.

2. The apparatus of claim 1, wherein the pallet handling apparatus is selected from the group of apparatus consisting of a pallet truck, an electric powered walkie and a lift truck.

3. The apparatus of claim 1, wherein the apparatus is substituted for a fork of the pallet handling apparatus.

4. The apparatus of claim 1, wherein two apparatus are provided and substituted for two forks of the pallet handling apparatus.

5. The apparatus of claim 1, wherein the frame member is rigid and has a predetermined elongated configuration with a length, width and height.

6. The apparatus of claim 1, wherein the frame member comprises at least one pivot block.

7. The apparatus of claim 1, wherein there are a plurality of load cells.

8. The apparatus of claim 7, wherein the load cells are arranged in laterally oriented pairs.

9. The apparatus of claim 1, wherein the fork member has at least one aperture for extension therethrough of a pallet handling apparatus wheel.

10. The apparatus of claim 1, further comprising an electronic control assembly communicatively connected to the at least one load cell.

11. The apparatus of claim 1, further comprising a vertically oriented fork back connected at a proximal end of the fork member.

12. A weighing apparatus for use in retrofitting a manual or powered pallet truck to provide weighing functionality, comprising two units, each unit comprising:
   a. a rigid horizontal frame member with proximal and distal ends having a top surface with at least one wheel aperture, the frame member comprising:
      a. proximal, central and distal top plates separated a predetermined distance to form an aperture for a wheel of the pallet truck, and
      b. a pair of outside strap members;
      c. a pair of proximal and a pair of distal inside strap members; and
      d. a pair of proximal and a pair of distal bottom strap members;
   b. a plurality of load cells fixedly connected to a top surface of the frame member, and
   c. a load bearing fork member disposed over the frame member and movably engaging a top surface of each of the load cells, whereby each load cell is adapted to vertically move in response to a load on the fork member, the fork member being unattached to the load cell whereby the fork member is free to move over the load cell to insulate the load cell from horizontal forces caused by bumping, jarring, starting, stopping and other movement associated with pallet transportation.

13. A weighing system for use in retrofitting an existing manual or powered pallet truck to provide weighing functionality to the pallet truck, comprising;
   a. an electronic control unit adapted to be connected to the pallet truck, the control unit having a display, an electronic weight calculation controller, and at least one control switch; and
   b. two fork units, each fork unit being adapted for substitution with one existing fork of the pallet handling apparatus, each fork unit comprising:
      i. a rigid horizontal frame member having an elongated configuration with proximal and distal ends, the frame member comprising:
         a. proximal, central and distal top plates, the central and distal top plates being separated a predetermined distance to form an aperture for a wheel of the pallet truck, and
         b. a pair of outside strap members;
         c. a pair of proximal and a pair of distal inside strap members; and
         d. a pair of proximal and a pair of distal bottom strap members;
      ii. six load cells fixedly connected to a top surface of the frame member, the load cells being disposed in proximal, medial and distal laterally oriented pairs,
      iii. a load bearing fork member having a proximal end and a distal end, the fork member being disposed over the frame member and movably engaging a top surface of each of the load cells; and
      iv. a vertically oriented fork back connected at a proximal end of the fork member, whereby each load cell is adapted to vertically move in response to a load on the fork member, the fork member being unattached to the load cell whereby the fork member is free to move over the load cell to insulate the load cell from horizontal forces caused by bumping, jarring, starting, stopping and other movement associated with pallet transportation.

* * * * *